United States Patent
Fejer et al.

(10) Patent No.: US 8,763,482 B2
(45) Date of Patent: Jul. 1, 2014

(54) PUSH-PULL CHAIN ACTUATOR WITH REDUCED CHAIN VIBRATIONS

(75) Inventors: Ole Fejer, Grevinge (DK); Jens Jørren Sørensen, København (DK)

(73) Assignee: VKR Holding A/S, Horsholm (DK)

(*) Notice: Subject to any disclaimer, the term of this patent is extended or adjusted under 35 U.S.C. 154(b) by 717 days.

(21) Appl. No.: 12/995,921

(22) PCT Filed: Jun. 3, 2009

(86) PCT No.: PCT/DK2009/000128
§ 371 (c)(1),
(2), (4) Date: Mar. 7, 2011

(87) PCT Pub. No.: WO2010/000260
PCT Pub. Date: Jan. 7, 2010

(65) Prior Publication Data
US 2011/0154923 A1    Jun. 30, 2011

(30) Foreign Application Priority Data
Jun. 4, 2008 (EP) .................................. 08010153

(51) Int. Cl.
*F16H 27/02* (2006.01)
(52) U.S. Cl.
USPC ........................................ 74/89.1; 74/89.22
(58) Field of Classification Search
USPC ......... 74/89.2, 89.22, 89.23, 37, 47; 474/206, 474/212; 254/311, 358; 590/5, 78, 93; 198/784
See application file for complete search history.

(56) References Cited

U.S. PATENT DOCUMENTS

| | | | | |
|---|---|---|---|---|
| 3,217,553 A | * | 11/1965 | Patrignani | 474/140 |
| 4,521,993 A | * | 6/1985 | Tacheny et al. | 49/325 |
| 5,203,746 A | * | 4/1993 | Lehnert | 474/206 |
| 5,358,384 A | * | 10/1994 | Dysarz | 417/555.2 |
| 5,895,880 A | * | 4/1999 | Golden | 89/47 |
| 6,419,603 B1 | * | 7/2002 | Grasl | 474/202 |
| 6,890,278 B2 | * | 5/2005 | Prince | 474/206 |
| 7,674,199 B2 | * | 3/2010 | Golden et al. | 474/206 |

(Continued)

FOREIGN PATENT DOCUMENTS

| | | |
|---|---|---|
| DE | 202006017304 | 2/2007 |
| EP | 0 994 231 A1 | 4/2000 |
| JP | 09014403 | 1/1997 |

OTHER PUBLICATIONS

International Search Report and Written Opinion for PCT/DK2009/000128, mailed Aug. 18, 2009.

*Primary Examiner* — Troy Chambers
*Assistant Examiner* — Zakaria Elahmadi
(74) *Attorney, Agent, or Firm* — Brinks Gilson & Lione

(57) ABSTRACT

A push-pull chain actuator (1) comprises a housing with a chain exit/entry opening (4) and a sprocket (2) arranged to engage a push-pull chain (3). The sprocket (2) causes the polygon effect. The actuator comprises a first chain guide part (10a) for guiding said push-pull chain (3) around the sprocket (2) and a second chain guide part (10b) for guiding said push-pull chain (3) at the correct angle between the chain exit/entry opening (4) and the sprocket (2). The second chain guide part (10b) is shaped as a meandering path to counteract the polygon effect. Alternatively, the second chain guide part (10b) can be shaped and dimensioned to reduce chain oscillations caused by the rollers (8c) engaging or disengaging the chain exit/entry opening (4) at the end of the second chain guide part (10b).

13 Claims, 5 Drawing Sheets

(56) References Cited

U.S. PATENT DOCUMENTS

| | | |
|---|---|---|
| 7,905,156 B2 * | 3/2011 | Scott et al. .................... 74/89.21 |
| 8,157,683 B2 * | 4/2012 | Korse ............................ 474/230 |
| 8,250,846 B2 * | 8/2012 | Soerensen ......................... 59/78 |
| 2004/0185978 A1 * | 9/2004 | Prince ........................... 474/206 |
| 2011/0308338 A1 * | 12/2011 | Schluckebier ................. 74/89.2 |

* cited by examiner

PUSH-PULL CHAIN ACTUATOR WITH REDUCED CHAIN VIBRATIONS

RELATED APPLICATIONS

This application claims the benefit under 35 U.S.C. §371 of International Patent Application No. PCT/DK2009/000128, filed Jun. 3, 2009, which claims priority to European Patent Application No. 08010153.8, filed Jun. 4, 2008, the contents of all of which are incorporated herein by reference in their entirety.

FIELD OF THE INVENTION

The present invention relates generally to actuators for push-pull chains, in particular to actuators with sprocket driven chains and guides for the push-pull chains used in these actuators.

BACKGROUND OF THE INVENTION

A push-pull chain can be extended and retracted by an actuator basically comprising a driving sprocket and a housing for the push-pull chain. The driving sprocket engages the push-pull chain's rollers and drives it in the desired direction. In order to keep these actuators compact the sprocket is provided with as few teeth as possible. However, typically the sprocket has five teeth since the so called polygon effect becomes to large and disruptive for the actuator operation with fewer than five teeth.

It is a well known problem that the polygon effect even with five or more teeth causes an irregular chain speed (assuming that the sprocket rotates with a substantially constant speed). The irregular chain speed results in irregular forces on the chain and the actuator and on the object to be actuated and causes noise, wear and reduced performance. Various attempts have been made in the prior art to overcome this problem. One of such attempts is disclosed in EP 1 227 056. In this document it is proposed to use noncircular gear wheels that are configured to offset the polygon effect. Thus, the sprocket will not rotate with the constant speed, but rather with the fluctuating speed, whereby the fluctuations are configured and dimensioned to ensure that the resulting chain speed is constant. However, noncircular gear wheels are more complicated to produce and cannot be obtained off the shelf from mass production. Thus, this solution is relatively expensive.

Another issue with roller chain actuators is there need to be provided with a chain exit guide that least supports two rollers at the time, otherwise the chain becomes instable. The links of the chain exit guide is a limiting factor in reducing the size of such actuators.

One way of reducing the noise has been discussed in U.S. Pat. No. 4,827,668 that disclose a chain operator having a chain and a casing having a spaced first and a second exit opening. The chain is guided by a track from the first exit to the second. The casing also has a drive sprocket for driving the chain. This guide is used to steer the chain correctly so that the sprocket teeth do not jam into the chain links this to avoid unwanted noise. This apparatus is difficult to install as it is large, the push-pull chain is prone to rattle and the engine sound is uneven. As the casing is used to muffle the engine sound it needs to substantially completely enclose the actuator components and needs to be of a thick material to effectively silence the actuator.

As the push-pull chain is moved by the sprocket it goes from a linear motion, through a circular motion and back to a linear motion again. It is in this point of circular motion that the varying contact arises partly due to the stiffness of the individual links.

Another problem is that as the push-pull chain is under push load, as e.g. in a push-pull chain being used to open a window, the push-pull chain is urged away from the sprocket due to the push force exerted on the push-pull chain by the load.

This effect may cause the push-pull chain to disengage the sprocket completely or partly leading to noise and partially or completely impaired function.

To overcome this, a first guide surface is used to guide the push-pull chain along the sprocket and prevents the push-pull chain from moving away from the sprocket and keeps the push-pull chain in close relation to the sprocket.

Actuators having guide surfaces such as these, however, still make a lot of noise and the push-pull chain is prone to rattle, in particular due to a swaying movement of the push-pull chain in the vicinity of the chain exit caused by the interaction of the sprocket with the push-pull chain.

In a small actuator a small sprocket is required and this leads to a limited number of teeth for a robust push-pull chain. Due to the size and geometry of the teeth only 1 to 2 chain links are in contact with the sprocket. For a sprocket with 5 teeth usually 1-1½ chain links are in contact with the sprocket at any given moment in time.

As the push-pull chain progresses along the sprocket it will first come in contact with the sprocket, follow it and then leave it. Doing so the rollers $8b$ of the push-pull chain are being engaged by different parts of the sprocket, i.e. the teeth of and the recesses in-between them. As the recesses are closer to the centre of the sprocket than the teeth, the sprocket has a polygonal geometry, and when the sprocket is rotating with a steady speed the resulting chain velocity is varying. Also the force transmitted from the sprocket to the push-pull chain will be un-even in both direction and amplitude. This is especially apparent when the push-pull chain is put under load and thereby urged away from the sprocket. Due to this polygon effect the push-pull chain will leave the actuator at the chain exit opening with varying angle, and the push-pull chain will sway or oscillate. For a sprocket only having a small number of teeth this problem becomes more apparent as the polygonal effect becomes more prominent as only a few links are in contact with the sprocket at any time which causes the effect of a single tooth to dominate the movement of the link and since the changes in the effective radius of the sprocket become more prominent. This causes the push-pull chain to move erratically which causes it to sway as it leaves the actuator. This swaying movement reduces the push-pull chain stability under push load as it increases the risk of the push-pull chain assuming a shape in which it is prone to collapse. Furthermore, rattling noise is generated as the push-pull chain clangs against the actuator and other parts and also by the push-pull chain itself. Especially for push-pull chains the stability is an important issue.

Another problem associated with chain actuators are the chain oscillations that are caused by the rollers leaving or entering the chain exit/entry opening. A transverse force is unavoidably applied to the chain and each time a roller enters or leaves the chain exit/entry there is a transverse movement of the roller that is getting into or out of contact with the chain guide. Theoretically, this problem could be reduced if the actuator and the chain could be constructed without any play or backlash between the rollers and the chain guide and between the rollers and the pins of the chain. However, in practise a certain amount of play is required and has to be accepted. The resulting chain oscillations result in noise and war and reduced performance and are therefore undesirable.

DISCLOSURE OF THE INVENTION

It is an object of this application to provide a push-pull chain actuator that overcomes or at least reduces the problems relating to the polygon effect stated above or in other words to produce a push-pull chain actuator that keeps the push-pull chain more stable, reduces the noise, produces a smooth operation, is easy to install and with a reduced variation of the angle in which the push-pull chain leaves the actuator.

By realizing that the polygon effect can be neutralized by providing a special shape for the chain exit guide between the sprocket and the chain exit/entry opening, the above object could be achieved in an unexpected manner.

Thus, this object is achieved by providing a push-pull chain actuator comprising a housing with a chain exit/entry opening, a push-pull roller chain with an open back, a sprocket arranged to engage the rollers of the push-pull chain, whilst a portion of the chain is guided around the sprocket, the sprocket causing a polygon effect during operation, a chain guide comprising: a first arc shaped chain guide part for guiding the portion of the push-pull chain around the sprocket by the rollers of the chain being guided by the first arc shaped chain guide, a second chain guide part for guiding the push-pull chain in a predetermined exit/entry direction between the sprocket and the chain exit opening by the rollers of the chain being guided by the second chain guide, wherein the chain guide is shaped and dimensioned to neutralize or at least reduce the polygon effect of the sprocket on the push-pull chain.

By guiding the push-pull chain in a way that neutralizes or at least reduces the effects of the polygonal effect of the sprocket the push-pull chain can be made to leave the actuator at a steady speed and load, causing less wear and noise. Further, this measure had the unexpected side effect that the angle at which the chain leaves the actuator varies less when the chain is moving and thus, the actuator can be constructed with a build in chain exit/entry angle closer to 90°, resulting in a higher push load bearing capacity of the chain.

The chain exit can be constructed shorter because the exit guide extends into the arc shaped guide that guides the chain around the sprocket. A shorter exit guide allows for a reduced width of the housing and therewith a slimmer actuator.

Preferably, the second chain guide part causes the rollers to follow a meandering path between the chain exit and the sprocket.

The second the chain guide part may comprise a path for the rollers formed by a series of interconnected arc shaped sections.

The geometrical centres of the arc shaped sections may be on the same side of the chain as the geometrical centre of the first chain guide part.

The geometrical centres of the arc shaped sections maybe substantially arranged on a line extending parallel to the predetermined chain exit/entry direction. The line may coincide with the centre of the sprocket.

The arc shaped sections in the series may have a radius that is substantially identical to the radius of the path defined by the first chain guide part.

The transition between the arc shaped sections is preferably rounded off or rendered smooth.

It is another object of the invention to provide a chain guide for a push-pull chain actuator, the chain guide comprising a first arc shaped chain guide part for guiding the portion of the push-pull chain around the sprocket by the rollers of the chain being guided by the first arc shaped chain guide, a second chain guide part for guiding the push-pull chain in a predetermined exit/entry direction between the sprocket and the chain exit opening by the rollers of the chain being guided by the second chain guide, characterised in that the chain guide is shaped and dimensioned to neutralize or at least reduce the polygon effect of the sprocket on the push-pull chain.

It is another object of the invention to provide a method for neutralizing or at least reducing the polygon effect of a sprocket on a push-pull chain in a chain actuator, comprising: providing a chain guide for guiding the chain around the sprocket of the actuator and between the sprocket and a chain exit/entry opening, by providing a chain guide that defines a meandering path for the push-pull chain between the sprocket and the chain exit/entry opening that neutralizes or at least reduces the polygon effect.

It is another object to provide a chain actuator in which the chain oscillations caused by the rollers engaging or disengaging the chain exit/entry opening.

This object is achieved by providing a push-pull chain actuator comprising a housing with a chain exit/entry opening, a push-pull roller chain with an open back and a given chain pitch between the pins that connect the links of the chain and support the rollers, a sprocket arranged to engage the rollers of the push-pull chain whilst a portion of the chain is guided around the sprocket, a chain guide comprising: a first arc shaped chain guide part for guiding the portion of the push-pull chain (3) around the sprocket by the rollers of the chain being guided by the first arc shaped chain guide, a second substantially straight chain guide part for guiding the push-pull chain in a predetermined exit/entry direction between the sprocket and the chain exit opening by the rollers of the chain being guided by guide surfaces of the second chain guide part, wherein the second substantially straight chain guide part is provided with a local deviation from a straight line, the local deviation reaching a maximum approximately one chain pitch length distance from chain exit opening and the deviation urging the rollers of the chain to move transversely towards the side of the second chain guide on which the sprocket is arranged when the rollers pass the deviation.

Preferably, the size of the maximum deviation is adjusted to the play or tolerance between the rollers and the pins and the play or tolerance between the rollers and the guide surfaces of the second chain guide part.

The deviation can be formed by a step formed in the guide walls of the second chain guide part.

The deviation may comprise a deviation portion that guides the rollers from the substantially straight extend of the second chain guide part towards the point or area of maximum deviation and a deviation portion that guides the rollers from the point or area of maximum deviation back to the substantially straight extend of the second chain guide part.

An actuator having a guide surface such as any of the above described will have the benefits of using less power, making less engine noise and less rattling as the guide cam steadies the push-pull chain.

An actuator such as described above can advantageously be used for a window system using a push-pull chain to open and close a window as this field has a high requirement for low noise levels, reliable operation, easy installing and low power consumption.

The above described also applies to push-pull chain actuators that are not driven by a motor as when the driving sprocket is wound by hand.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF PREFERRED EMBODIMENTS

In the following detailed description, the invention will be described by embodiments.

Figure 1:
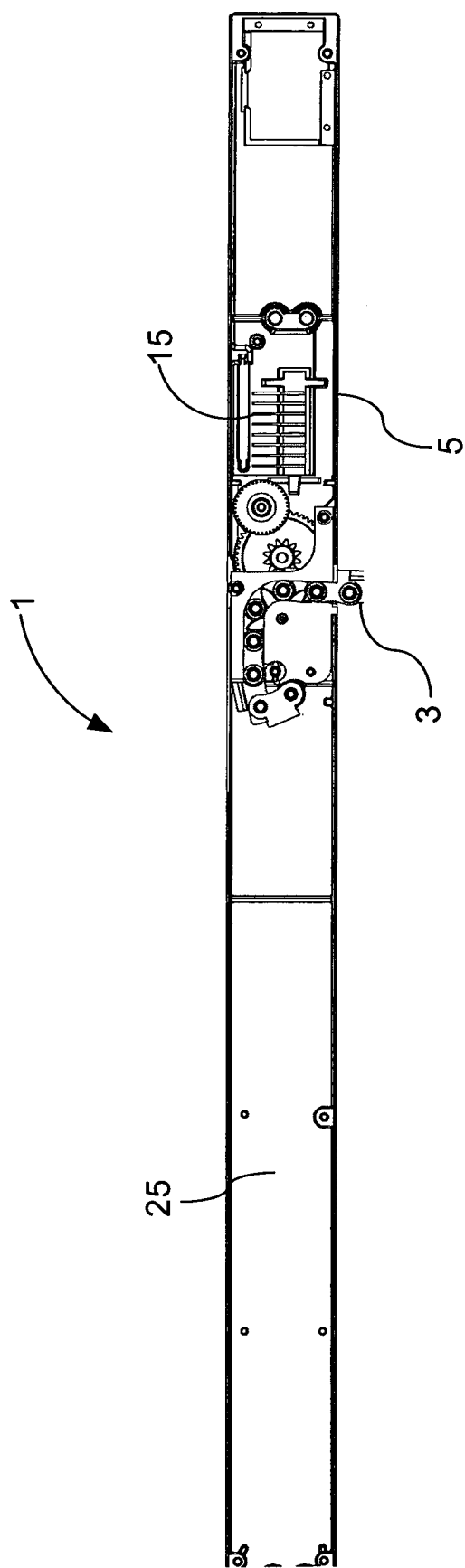
FIG. 1 is a cross-sectional view though an actuator according to an embodiment of the invention.
Figure 2:
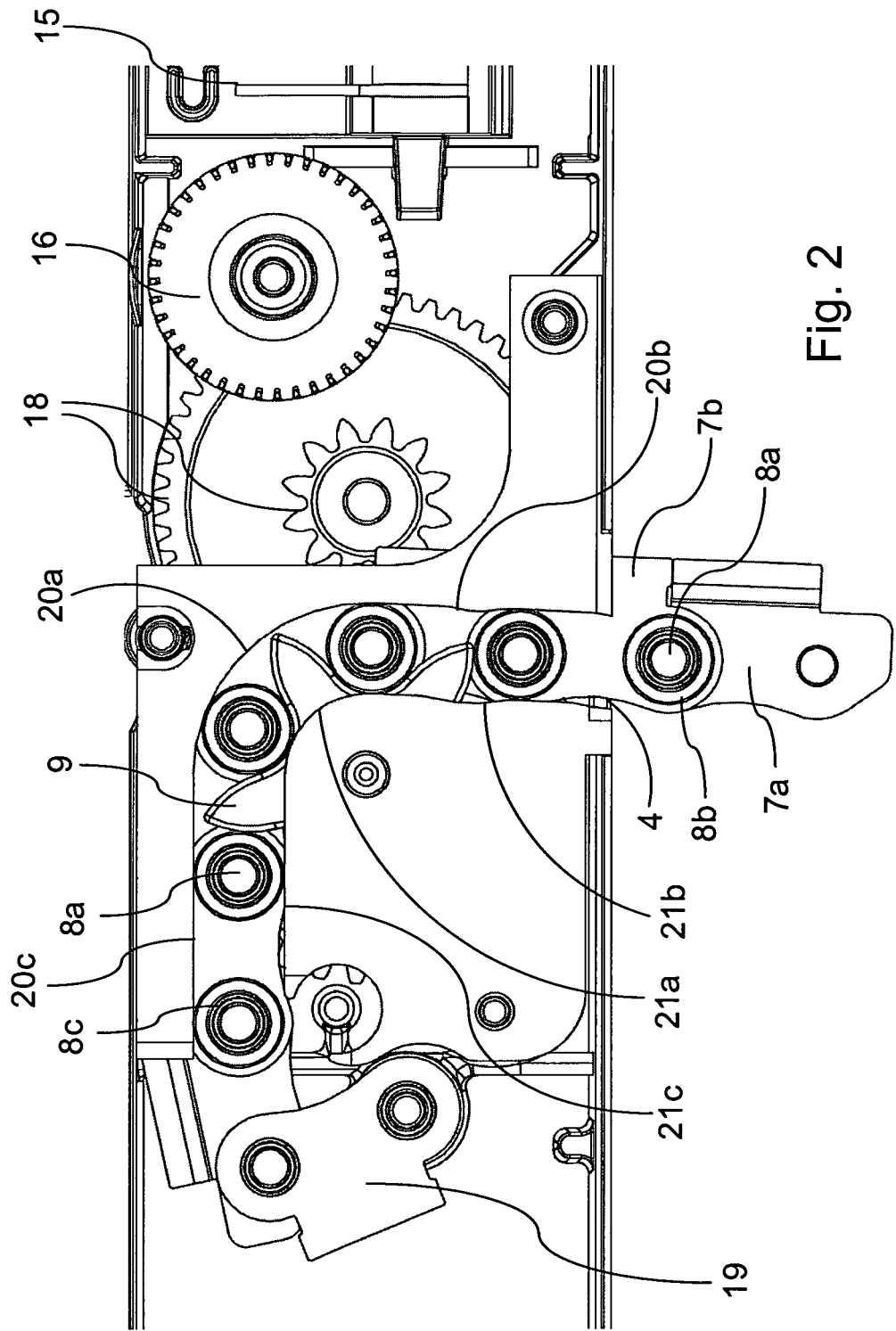
FIG. 2 is a detailed view of a section of FIG. 1.

With reference to FIGS. 1 and 2 a push-pull chain actuator 1 according to an embodiment of the invention is shown. The actuator has a housing 5 and is provided with a push-pull chain 3 and with an electric drive motor 15. The housing 1 is provided with the chain magazine 25, which is empty in FIG. 1 since the push-pull chain 3 is shown in its fully extended position. For practical reasons the push-pull 3 chain has not been drawn in its full length, but it is understood that the push-pull chain 3 can extend much further from the actuator 1 than shown in FIG. 1.

The actuator 1 has a sprocket 2 having a number of teeth 9 (in this embodiment 5 teeth) and a chain exit opening 4 adjacent to the sprocket 2 through which the push-pull chain 3 can extend from the actuator 1. The actuator 1 has a housing 5 for receiving the push-pull chain 3. An electric drive motor 15 drives the sprocket 2 via a reduction gear that includes worm (which cannot be seen in this cross-section), a wormwheel 16 and further reduction gears 18 in an as such well known manner. According to another embodiment (not shown) the actuator is manually powered.

The push-pull chain 3 includes a plurality of inner links 7a and outer links 7b that are connected by drive pins 8a around which the links 7a, 7b can move in relation to each other so that the push-pull chain 3 is at least partially flexible. The opposing inner links of a pair are connected by bushings 8c. The bushings 8c are provided with rollers 8b to minimize the friction caused while being engaged by the sprocket 2. The chain can freely bend from a configuration in a straight line in one direction. However, from the straight configuration the push-pull chain 3 can only bend to a limited extent in the opposite direction to provide the required stiffness for the push action in an as such well known manner. The stiffness in the one direction is obtained in a well known manner through the shape of the inner and outer links 7a, 7b, so that their ends abut when the chain 3 is bend in the "opposite" direction. Both sides of the chain 3 are open (as opposed to some types of push-pull chains that have a closed back) so that the rollers 8b are accessible for contact with guide surfaces on both sides of the push-pull chain 3. In FIG. 2 the internal extremity 19 of the push-pull chain 3 is visible with the push-pull chain 3 being in its fully extended position.

The sprocket 2 has a number of teeth 9. The higher the number of teeth 9 the smaller angular distance between them which leads to either a larger sprocket 2 or thinner teeth 9 and/or corresponding chain dimensions i.e. a weaker push-pull chain. To ensure a robust and load bearing structure the sprocket 2 should have as few teeth 9 as possible. However, a large angle between the teeth 9 worsens the so called polygon effect that results in an uneven chain speed and correspondingly uneven load, both being undesirable effects. A sprocket 2 with less than four teeth 9 leads to a very uneven operation as the angular distance between the teeth get so large that the polygon effect gets very prone. With more than 5 to 6 teeth the sprocket becomes bigger and the push-pull chain 3 thinner and thereby weaker if the same dimensions for the housing are to be kept.

Good results have been achieved with a sprocket having five teeth 9 for actuators used to open close windows, doors and the like. The polygon effect is still noticeable, but the chain will move reasonably smooth.

As the push-pull chain 3 is driven by the sprocket 2 it undertakes first a substantially linear motion that is changed into a semi-circular or angular motion around the sprocket 2 and finally another substantially linear motion as it extends from the actuator 1. Due to this the actuator 1 can be installed along narrow ledges, window sills and the like as the push-pull chain 3 does not extend linearly all the way, i.e. to the back of the actuator and away from a ledge or the like.

Figure 3:
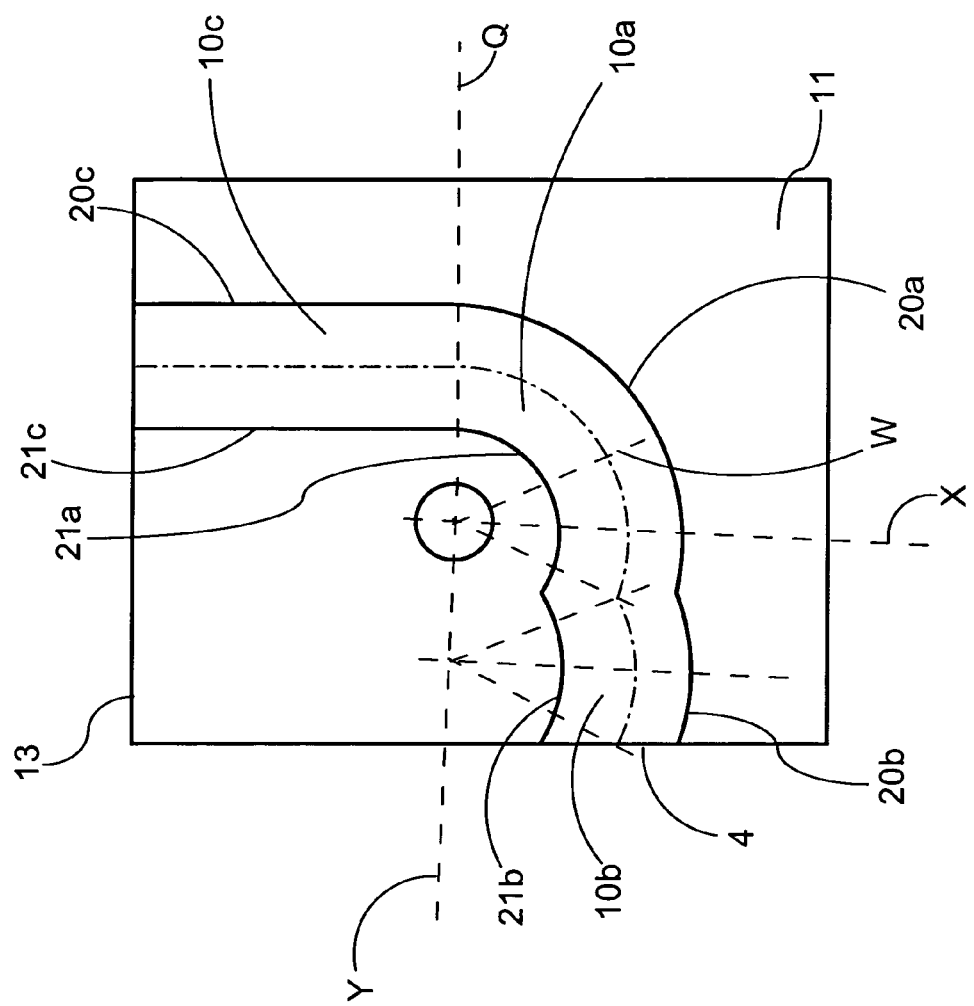
FIG. 3 is diagrammatic view of a chain guide for use in an actuator according to the invention.

FIGS. 2 and 3 illustrate a chain guide of the actuator of FIG. 1 in greater detail. The chain guide ensures that the push pull chain 3 follows the correct path of movement between the chain magazine 25 and the chain exit/entry opening 4. For this purpose, the chain guide is provided with guide surfaces on which the rollers 8b run when the push-pull chain 3 moves through the chain guide. Thus, the push-pull chain 3 is guided by contact between the rollers 8b and the guide surfaces of the chain guide.

A first chain guide part 10a ensures that the push-pull chain 3 follows an arc shaped path around a portion of the sprocket 2 so that the sprocket 2 can engage the rollers 8b and transmit the load of the push-pull chain 3 to the sprocket 2. When the push-pull chain 3 is placed under push load the chain links 7a, 7b are subjected to a force urging them away from the sprocket 2. This load can be the weight or inertia of a window (not shown) that is being opened, closed or maintained in an open position by the push-pull chain 3 using the actuator 1. The first chain guide part 10a includes a radially outer arc shaped guide surface 20a that serves to guide the chain links 7a, 7b around the sprocket 2 and a radially inner guide surface 21a that will need to provide no or little guiding since the guiding of the chain in the radially inner direction will be provided by the sprocket 2. The guide surface 20a is arranged on a first guide cam 11 and the guide surface 21a is provided on a second guide cam 13. The first guide cam 11 and the second guide cam 13 form together the chain guide. The first chain guide part 10a extends between interrupted lines Q and W for approximately 90°. The first chain guide part 10a is arranged to be in contact with the rollers 8b of the chain and to keep the rollers 8b close to the sprocket 2 and thereby guide the push-pull chain 3 around the sprocket 2 also when the push-pull chain 3 is under push load.

Figure 5:
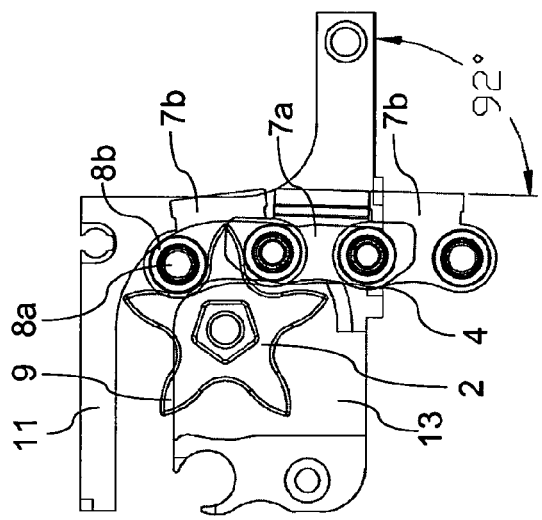

A second chain guide part 10b serves to guide the push-pull chain 3 between the sprocket 2 and the chain exit/entry opening 4, and in particular to ensure the correct exit/entry direction of the chain to provide the required stability against push loads. The second chain guide part 10b is provided with two opposite guide surfaces: a first exit/entry guide surface 20b that is formed on the first guide cam 11 and a second exit/entry guide surface 21b that is formed on the second guide cam 13. The second chain guide part 10b extends between interrupted line X the chain exit/entry opening 4 (FIG. 5). The second chain guide part 10*b* defines a meandering path for the chain. The resulting meandering movement of the rollers 8*b* that can be best seen in FIGS. 4 to 6 counteracts or at least reduces the polygon effect. The details of the second chain guide portion 10*b* will be described in greater detail further below.

A third chain guide part 10*c* serves to guide the chain between the chain magazine and the first chain guide part 10*a*. The third chain guide part 10*c* is provided with opposing guide surfaces 20*c* and 21*c* for ensuring that the chain travels correctly between the sprocket 2 and the chain magazine.

Figure 6:
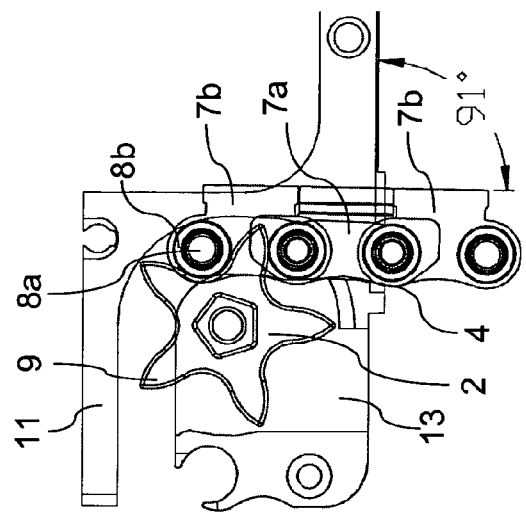
FIGS. 4 to 6 are a series of views on the chain guide, chain and sprocket of the actuator of FIG. 1 illustrating the movement of the chain through the chain guide.
Figure 4:
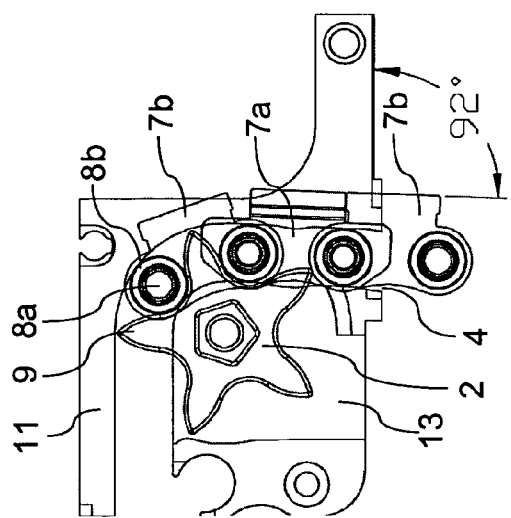

In order to make use of the push-pull chain's 3 supportive properties the actuator is designed so that the push-pull chain 3 extends at an angle that slightly exceeds a straight angle from the actuator 1 so that the push-pull chain 3 is urged into its stable orientation. This desired or correct angle is indicated in FIGS. 4-6.

During operation the irregular shape of the chain in combination with the polygon effect causes in conventional actuators with a non-meandering exit guide (the part of the chain guide that corresponds to the second chain guide part) fluctuations of the actual chain angle from the design angle. Typically the chain angle variations in the conventional chain guides is typically ±2° from the angle with which the exit guide is constructed. Since the chain angle should under no circumstances become less than 90°, the conventional actuators have typically been constructed with an angle of 93° or more so that the will not lead to fluctuations that cause the actual chain angle to fall below 91°. The meandering path on the second chain guide part (also called chain exit guide) 10*b* annihilates or at least greatly reduces the fluctuations of the angle of the push pull chain 3 leaving the actuator 1 completely or at least substantially and therefore the chain that according to the present invention can be constructed with an inbuilt angle as low as 91.5°. As is illustrated in FIGS. 4 to 6, the fluctuation of the chain angle with the meandering exit guide or second chain guide part 10*b* is only ±0.5°, i.e. the chain changes between 91° and 92° with an inbuilt chain angle of 91.5°. The building chain angle can with meandering chain path according to the invention be kept closer to 90° which means that the chain support higher push loads. Further, the reduction in swaying movement of the push pull chain 3 will reduce the amount of noise and rattling calls by the actuator 1.

The reduction or neutralization of the polygon effect further reduces the amount of noise produced by the actuator 1 in operation since the movement of the chain angle of the object to be moved will be smooth and without fluctuations.

In order counteract or off-set the polygon effect the second chain guide part 10*b* can be meandering undulating, lobed, have protrusions, consist of curved portions or deviate from a straight line or a constant radius curve in various ways. In order to provide the meandering movement of the chain the second chain guide part 10*b* or exit/entry guide needs guide surfaces on both sides of the chain/rollers. Theoretically, the mathematically optimal form for completely neutralizing the polygon effect is by shaping the second chain guide part 10*b* as a series of interconnected arc sections, the arc sections having a radius that is equal to the radius of the first chain guide part 10*a* and the arc sections hang an angular extend equal to the angle between the teeth of the sprocket. With a sprocket with five teeth this gives a maximum angular extend of the individual arc sections of 72° (the same angular distance as the angular distance between the teeth of the sprocket). The arc sections could be made smaller than 72° but the neutralizing effect will be less effective. It should be noted that the "first" arc section at the sprocket extends halfway into the "conventional" substantially 90° arc section that forms the first chain guide part 10*a*. Thus, as shown in FIG. 3, it appears that the first arc section of the second part of the chain guide 10*b* is only 36°, this is because the arc around the sprocket 2 cannot be extended further than 36° over the interrupted line marked X. The next arc sections are in the embodiment of FIG. 3 are each 72° and have a radius identical to the radius of the first chain guide part 10*a*. Also the first 36° arc section has a radius that is substantially identical to the radius of the first chain guide part 10*a*.

The geometrical centres of said arc shaped sections of the second chain guide part 10*b* are on the same side of the chain 3 as the geometrical centre of the first chain guide part 10*a*.

The geometrical centres of said arc shaped sections are substantially arranged on a line (indicated by the interrupted line marked Y) extending parallel to the predetermined chain exit/entry direction. The line marked Y coincides with the centre of the sprocket 2.

Thus, the chain guide shown in FIG. 3 is constructed in accordance with the mathematically optimal way to fully neutralize the polygon effect. However, in practice the sharp transitions between the arc sections, at the guide surfaces 20*b* and 21*b* prevent smooth rolling of the rollers 8*b*, and in practical embodiments the sharp transitions will be rounded off.

The second chain guide part 10*b* needs to extend for a length that ensures that at least two rollers 8*b* are supported at any time by the second chain guide part 10*b* (is this is also nicely illustrated in FIGS. 4 to 6). This means that the second chain guide part 10*b* must extend for at least 2.5 times the pitch (pitch between the drive pins 8*a*) of the chain 3. This requirement is fulfilled with two arc sections of 72° for an actuator with a five tooth sprocket. The reduction of length of the chain exit guide 10*b* can be explained as follows. It is noted that the first arc shaped section of the exit guide 10*b* extends halfway (for 36° with arcs that are 72°) into the first chain guide part 10*a*, and thus the exit guide actually starts already at the interrupted line indicated W. Thus, the chain exit guide is partially wrapped around the sprocket and is drawn closer to the sprocket resulting in the exit opening being located closer to the sprocket and the width of the actuator being reduced when compared to an actuator with a conventional chain exit guide. An actuator with a reduced width is advantageous since such an actuator can be constructed slimmer and therefore easier to mount into a window frame or the like Of course it is possible to use a longer chain exit guide 10*b* with more than two arc sections if desired.

It should be noted that the guide surfaces can be subdivided into smaller surfaces working together to steady the push-pull chain 3 or combined into one longer guiding surface that renders it easier to install them The guide surfaces 20*a*, 20*b*, 20*c*, 21*a*, 21*b*, 21*c* can be designed to either only abut a joints or rollers 8*b* under and/or over a sprocket tooth 9 or have a slit through which the sprocket tooth 9 can pass depending on the length of the sprocket tooth 9 in relation to the width of the drive pin 8*a*. This also makes it possible to arrange the second guide cam 13 on top of and under the sprocket 2 and use it as a supportive member for the sprocket 2.

In the final portions of both guide cams 11 and 13 the second and third guiding surfaces 10*b* and 10*a* are lobed or undulating or having curved portions to counteract the polygon properties of the sprocket 2 interacting with the chain links 7*a*, 7*b*.

Figure 7:
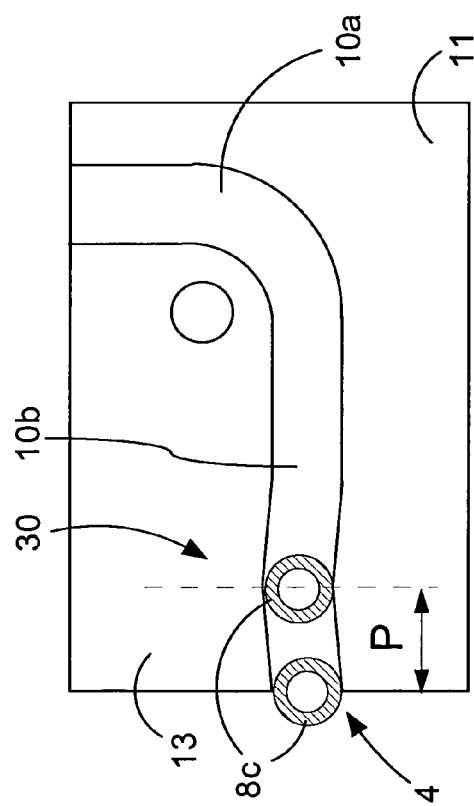
FIGS. 7 to 9 are diagrammatic views of a chain guide according other embodiments of the invention.
Figure 10:
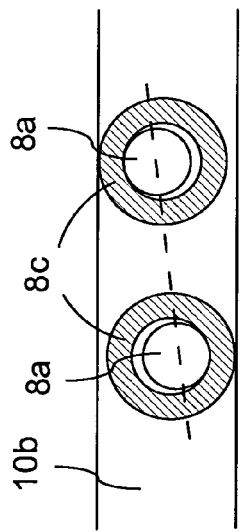
FIG. 10 is a schematic drawing to illustrate misalignment of the chain due to tolerances forces acting on the chain.

FIG. 7 illustrates another embodiment of the invention. This embodiment relates to a chain actuator that is essentially identical to the chain actuator described above, except for the second chain guide part 10b. In this embodiment the aim of the chain guide is to reduce chain vibrations that are common in conventional chain actuators. These chain vibrations are caused by the effect of the rollers 8c leaving (disengaging) the chain guide at the exit/entry opening 4 (when the actuator 1 is extending) or of the rollers 8c entering (engaging) the chain guide at the exit/entry opening 4 (when the actuator 1 is retracting) and the transverse movement of the rollers 8c when entering/exiting the chain guide. The chain 3 is always slightly bent beyond the configuration in which it is straight (in one direction the chain cannot bend further than slightly beyond this configuration) so that the (push pull) chain 3 can act as a push rod. The bending beyond the straight line configuration creates a transverse force on the chain links 7a, 7b in the second chain guide part 10b and this force urges the chain links 7a, 7b to misalign in the second chain guide part 10b. This misalignment is possible due to a certain amount of (required) play or backlash between the rollers 8b and the guide surfaces of the second chain guide part 10b and between the pins 8a and the rollers 8b (there can be bushings 8c provided between the pins 8a and the rollers 8b). This play and misalignment is illustrated in an exaggerated form in FIG. 10.

Thus, a transverse force acts on the rollers 8b when they leave or enter the chain exit/entry opening 4. The transverse force in combination with the play between the rollers 8c and the second chain guide part 10b and between the rollers 8c and the pins 8a creates an oscillating transverse movement of the rollers 8c and of the chain 3. This oscillating transverse movement (chain vibration) in conventional chain actuators is largest at the chain exit/entry 4 and causes the part of the chain 3 that is not received in the actuator 1 to oscillate when the chain 3 is moving. The vibrations and sound associated with these oscillations can be detrimental to the actuator 1, and any components directly or indirectly connected therewith. Further, the noise generated by the oscillations can be experienced as disturbing.

The chain guide shown in FIG. 7 removes or at least reduces this oscillating transverse movement. Hereto, the second chain guide part 10b, which is essentially straight, is provided with a deviation 30 from the straight line. The deviation 30 has a predetermined maximum that is arranged approximately one chain pitch "P" length distance from the chain exit. The location of the maximum deviation is indicated by the interrupted line in FIG. 7. The size of the maximum deviation is adjusted to the play or tolerance between the rollers 8c and the pins 8a and the play or tolerance between the rollers 8c and the guide surfaces of the second chain guide part 10b. The deviation is in the direction of the side of the chain guide at which the sprocket is located.

Due to the deviation 30 one of the rollers 8c of the chain 3 is forced to move in a transverse direction to an extend that substantially corresponds to the maximum of the deviation 30 and thereby changes the orientation of the last/first chain link 7a, 7b in the chain guide. The changed orientation places the chain links 7a, 7b near the chain exit/entry opening 4 in an optimum orientation for reducing and even removing and transverse chain movement at the chain exit/opening 4.

The deviation 30 includes in the embodiment of FIG. 7 two parallel sets of straight guide surface sections of the second chain guide. Each of these sets is arranged at an angle with the overall straight extend of the second chain guide part 10b. Seen in a chain extension direction, one set of straight guide surfaces guides the rollers 8c to the maximum deviation and the other set of straight guide surfaces guides the rollers 8c from the maximum deviation back to the straight extend of the second chain guide part 10b.

Figure 8:
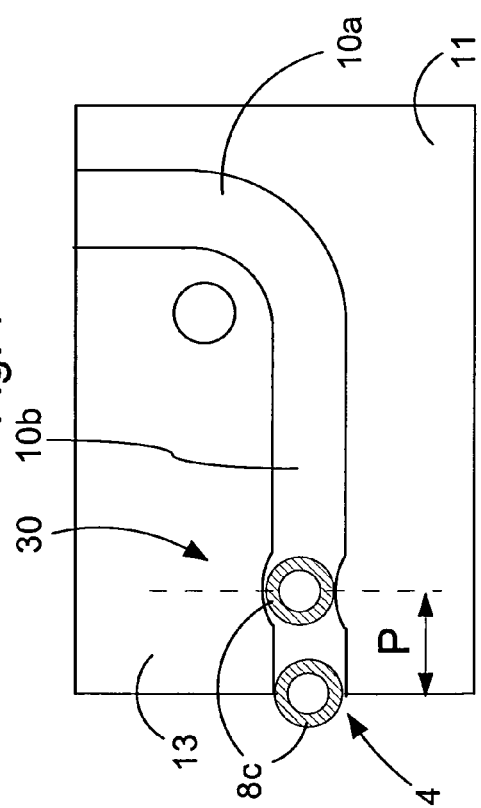

FIG. 8 illustrates another embodiment of the invention that is essentially identical to the embodiment of FIG. 7, except that the deviation has a different shape. In the embodiment of FIG. 8 the deviation is formed by two curved sections in the guide surfaces of the second chain guide part 10b.

Figure 9:
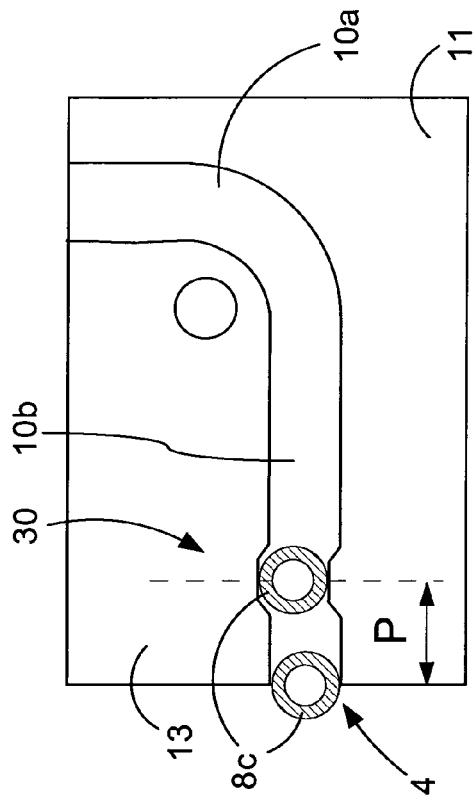

FIG. 9 illustrates yet another embodiment of the invention that is also essentially identical to the embodiment of FIG. 7, except that the deviation has a different shape. In the embodiment of FIG. 9 the deviation is formed by stepped sections in the guide surfaces of the second chain guide part 10b.

Even though the embodiments have been described focusing on the operation when the chain is extended from the actuator it should be understood that the corresponding situation is present also when the chain is retracted.

It should be understood that the actuator as described above can also be used beneficially for actuators that are manually operated.

It should be understood that the embodiments can be combined.

The term "comprising" as used in the claims does not exclude other elements or steps. The term "a" or "an" as used in the claims does not exclude a plurality The reference signs used in the claims shall not be construed as limiting the scope.

Although the present invention has been described in detail for purpose of illustration, it is understood that such detail is solely for that purpose, and variations can be made therein by those skilled in the art without departing from the scope of the invention.

The invention claimed is:

1. A push-pull chain actuator comprising:
    a housing with a chain exit/entry opening,
    a push-pull roller chain with an open back,
    a sprocket arranged to engage rollers of the push-pull roller chain, whilst a portion of the push-pull roller chain is guided around the sprocket, said sprocket causing a polygon effect during operation,
    a chain guide comprising:
        a first arc shaped chain guide part for guiding said portion of said push-pull roller chain around said sprocket by the rollers of the push-pull roller chain being guided by the first arc shaped chain guide part,
        a second chain guide part for guiding said push-pull roller chain in a predetermined exit/entry direction between the sprocket and a chain exit opening by the rollers of the push-pull roller chain being guided by the second chain guide part,
    wherein said second chain guide part is shaped and dimensioned to neutralize or at least reduce the polygon effect of the sprocket on the push-pull roller chain by including a deviation from a straight line that causes the rollers to follow a meandering path between the chain exit opening and the sprocket,
    wherein the second chain guide part comprises a path for said rollers formed by a series of interconnected arc shaped sections,
    wherein geometrical centres of said arc shaped sections are on a same side of the push-pull roller chain as geometrical centres of the first chain guide part, and
    wherein the geometrical centres of said arc shaped sections are substantially arranged on a line (Y) extending parallel to the predetermined chain exit/entry direction.

2. The actuator according to claim 1, wherein said line (Y) coincides with a centre of the sprocket.

3. A push-pull chain actuator comprising:
a housing with a chain exit/entry opening,
a push-pull roller chain with an open back,
a sprocket arranged to engage rollers of the push-pull roller chain, whilst a portion of the push-pull roller chain is guided around the sprocket, said sprocket causing a polygon effect during operation,
a chain guide comprising:
 a first arc shaped chain guide part for guiding said portion of said push-pull roller chain around said sprocket by the rollers of the push-pull roller chain being guided by the first arc shaped chain guide part,
 a second chain guide part for guiding said push-pull roller chain in a predetermined exit/entry direction between the sprocket and a chain exit opening by the rollers of the push-pull roller chain being guided by the second chain guide part,
wherein said second chain guide part is shaped and dimensioned to neutralize or at least reduce the polygon effect of the sprocket on the push-pull roller chain by including a deviation from a straight line that causes the rollers to follow a meandering path between the chain exit opening and the sprocket, wherein the second chain guide part comprises a path for said rollers formed by a series of interconnected arc shaped sections, and
wherein the arc shaped sections in said series have a radius that is substantially identical to a radius of the a path defined by the first chain guide part.

4. A push-pull chain actuator comprising:
a housing with a chain exit/entry opening,
a push-pull roller chain with an open back,
a sprocket arranged to engage rollers of the push-pull roller chain, whilst a portion of the push-pull roller chain is guided around the sprocket, said sprocket causing a polygon effect during operation,
a chain guide comprising:
 a first arc shaped chain guide part for guiding said portion of said push-pull roller chain around said sprocket by the rollers of the push-pull roller chain being guided by the first arc shaped chain guide part,
 a second chain guide part for guiding said push-pull roller chain in a predetermined exit/entry direction between the sprocket and a chain exit opening by the rollers of the push-pull roller chain being guided by the second chain guide part,
wherein said second chain guide part is shaped and dimensioned to neutralize or at least reduce the polygon effect of the sprocket on the push-pull roller chain by including a deviation from a straight line that causes the rollers to follow a meandering path between the chain exit opening and the sprocket,
wherein said deviation from a straight line reaches a maximum deviation one chain pitch length distance from the chain exit opening and said deviation urges the rollers of the push-pull roller chain to move transversely towards a side of the second chain guide on which the sprocket is arranged when the rollers pass the deviation.

5. The actuator according to claim 4, wherein a size of the maximum deviation is adjusted to a play or tolerance between the rollers and pins and the play or tolerance between the rollers and guide surfaces of the second chain guide part.

6. The actuator according to claim 4, wherein said deviation is formed by a step formed in guide walls of the second chain guide part.

7. The actuator according claim 6, wherein said deviation comprises a deviation portion that guides the rollers from a substantially straight extend of the second chain guide part towards a point or area of maximum deviation and a deviation portion that guides the rollers from the point or area of maximum deviation back to the substantially straight extend of the second chain guide part.

8. The actuator according to claim 1, wherein a transition between said arc shaped sections is rounded off or rendered smooth.

9. The actuator according to claim 2, wherein a transition between said arc shaped sections is rounded off or rendered smooth.

10. The actuator according to claim 3, wherein a transition between said arc shaped sections is rounded off or rendered smooth.

11. The actuator according to claim 2, wherein said deviation from a straight line reaches a maximum deviation one chain pitch length distance from chain exit opening and said deviation urges the rollers of the push-pull roller chain to move transversely towards a side of the second chain guide on which the sprocket is arranged when the rollers pass the deviation.

12. The actuator according to claim 3, wherein said deviation from a straight line reaches a maximum deviation one chain pitch length distance from chain exit opening and said deviation urges the rollers of the push-pull roller chain to move transversely towards a side of the second chain guide on which the sprocket is arranged when the rollers pass the deviation.

13. The actuator according to claim 1, wherein said deviation from a straight line reaches a maximum deviation one chain pitch length distance from chain exit opening and said deviation urges the rollers of the push-pull roller chain to move transversely towards a side of the second chain guide on which the sprocket is arranged when the rollers pass the deviation.

* * * * *